United States Patent
Duffy et al.

(10) Patent No.: US 6,453,874 B1
(45) Date of Patent: Sep. 24, 2002

(54) APPARATUS AND METHOD FOR CONTROLLING FUEL INJECTION SIGNALS DURING ENGINE ACCELERATION AND DECELERATION

(75) Inventors: Kevin P. Duffy, East Peoria; Brian G. McGee, Chillicothe; Matthew R. Roth, Metamora, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/616,122

(22) Filed: Jul. 13, 2000

(51) Int. Cl.$^7$ .............................................. F02M 51/00
(52) U.S. Cl. ....................... 123/446; 123/300; 123/480; 123/492; 123/493
(58) Field of Search .................................. 123/299, 300, 123/431, 480, 446, 456, 357, 371, 436, 492, 493

(56) References Cited

U.S. PATENT DOCUMENTS

| | | | |
|---|---|---|---|
| 4,545,355 A | * 10/1985 | Takao et al. ................. | 123/489 |
| 4,571,683 A | 2/1986 | Kobayashi et al. | |
| 4,576,135 A | 3/1986 | Johnson | |
| 4,621,599 A | 11/1986 | Igashira et al. | |
| 4,704,999 A | 11/1987 | Hashikawa et al. | |
| 4,729,056 A | 3/1988 | Edwards et al. | |
| 4,836,161 A | 6/1989 | Abthoff et al. | |
| 4,922,878 A | 5/1990 | Shinogle et al. | |
| 5,020,979 A | 6/1991 | Askew | |
| 5,070,836 A | 12/1991 | Wahl et al. | |
| 5,113,833 A | 5/1992 | Nagano et al. | |
| 5,245,972 A | 9/1993 | Denz et al. | |
| 5,267,545 A | 12/1993 | Kitson | |
| 5,268,842 A | 12/1993 | Martson et al. | |
| 5,277,164 A | 1/1994 | Takahashi et al. | |
| 5,320,079 A | 6/1994 | Kuwabara | |
| 5,379,733 A | 1/1995 | Haddick et al. | |
| 5,402,760 A | * 4/1995 | Taeuchi et al. ............. | 123/300 |
| 5,407,131 A | 4/1995 | Maley et al. | |
| 5,427,072 A | 6/1995 | Udo | |
| 5,427,083 A | 6/1995 | Ahern | |
| 5,450,829 A | 9/1995 | Beck | |
| 5,460,128 A | 10/1995 | Kruse | |
| 5,492,098 A | 2/1996 | Hafner et al. | |
| 5,499,608 A | 3/1996 | Meister et al. | |

(List continued on next page.)

FOREIGN PATENT DOCUMENTS

| | | |
|---|---|---|
| EP | 0 221 832 A2 | 5/1987 |
| EP | 1 077 321 A2 | 2/2001 |
| FR | 2775316 | 8/1999 |
| JP | 62055458 | 3/1987 |

OTHER PUBLICATIONS

SAE 2/24–27, 1997 a New Concept for Low Emission Diesel Combusion—Printed from Diesel Engine Combustion Processes and Emission Control Technologies (SP–1246).

Primary Examiner—Tony M. Argenbright
Assistant Examiner—Hai Huynh
(74) Attorney, Agent, or Firm—Blackwell Sanders Peper Martin LLP

(57) ABSTRACT

An apparatus and method for controlling a multi-shot fuel injection signal during certain acceleration and deceleration conditions when a predetermined threshold emissions limit will be exceeded, the apparatus and method including an electronic controller coupled to the electronically controlled fuel injectors of the engine and operable to recognize the certain acceleration or deceleration conditions based upon certain sensed engine performance parameters. The controller is further operable to eliminate or disable one or more fuel shots associated with a multi-shot fuel injection signal to control emissions when the certain acceleration or deceleration conditions are recognized.

21 Claims, 4 Drawing Sheets

U.S. PATENT DOCUMENTS

| | | |
|---|---|---|
| 5,507,260 A | 4/1996 | Hintzen |
| 5,540,205 A | 7/1996 | Davis et al. |
| 5,549,092 A | 8/1996 | Hasegawa et al. |
| 5,566,650 A | 10/1996 | Kruse |
| 5,566,660 A | 10/1996 | Camplin et al. |
| 5,588,415 A | 12/1996 | Ahern |
| 5,609,131 A | 3/1997 | Gray, Jr. et al. |
| 5,615,654 A * | 4/1997 | Weisman, II et al. ....... 123/350 |
| 5,634,448 A | 6/1997 | Shinogle et al. |
| 5,647,317 A | 7/1997 | Weisman, II et al. |
| 5,678,521 A | 10/1997 | Thompson et al. |
| 5,685,273 A | 11/1997 | Johnson et al. |
| 5,701,870 A | 12/1997 | Gottshall et al. |
| 5,704,336 A | 1/1998 | Wrobel |
| 5,722,373 A | 3/1998 | Paul et al. |
| 5,732,680 A | 3/1998 | Ninomiya et al. |
| 5,740,775 A | 4/1998 | Suzuki et al. |
| 5,740,776 A | 4/1998 | Enderle et al. |
| 5,746,183 A | 5/1998 | Parke et al. |
| 5,778,850 A | 7/1998 | Buratti et al. |
| 5,794,585 A | 8/1998 | Yonezawa et al. |
| 5,803,049 A | 9/1998 | Harcombe |
| 5,832,901 A | 11/1998 | Yoshida et al. |
| 5,839,275 A | 11/1998 | Hirota et al. |
| 5,865,153 A | 2/1999 | Matsumoto |
| 5,865,158 A | 2/1999 | Cleveland et al. |
| 5,893,347 A | 4/1999 | McGee et al. |
| 5,924,403 A * | 7/1999 | Thomas ..................... 123/300 |
| 5,947,380 A | 9/1999 | Coldren et al. |
| 5,979,398 A | 11/1999 | Yanagihara |
| 5,979,412 A | 11/1999 | Werner |
| 5,986,871 A | 11/1999 | Forck et al. |
| 6,000,384 A | 12/1999 | Brown et al. |
| 6,006,727 A | 12/1999 | Katashiba et al. |
| 6,009,849 A | 1/2000 | Yamanoto et al. |
| 6,014,956 A | 1/2000 | Cowden et al. |
| 6,021,370 A | 2/2000 | Bellinger et al. |
| 6,026,780 A | 2/2000 | Barnes et al. |
| 6,032,642 A | 3/2000 | Trumbower et al. |
| 6,044,824 A | 4/2000 | Mamiya et al. |
| 6,067,954 A * | 5/2000 | Kudou et al. ............... 123/299 |
| 6,082,331 A * | 7/2000 | Barnes et al. ............... 123/446 |
| 6,085,730 A * | 7/2000 | Coatesworth et al. ....... 123/480 |
| 6,363,314 B1 * | 3/2002 | Hafner et al. ............... 123/446 |

* cited by examiner

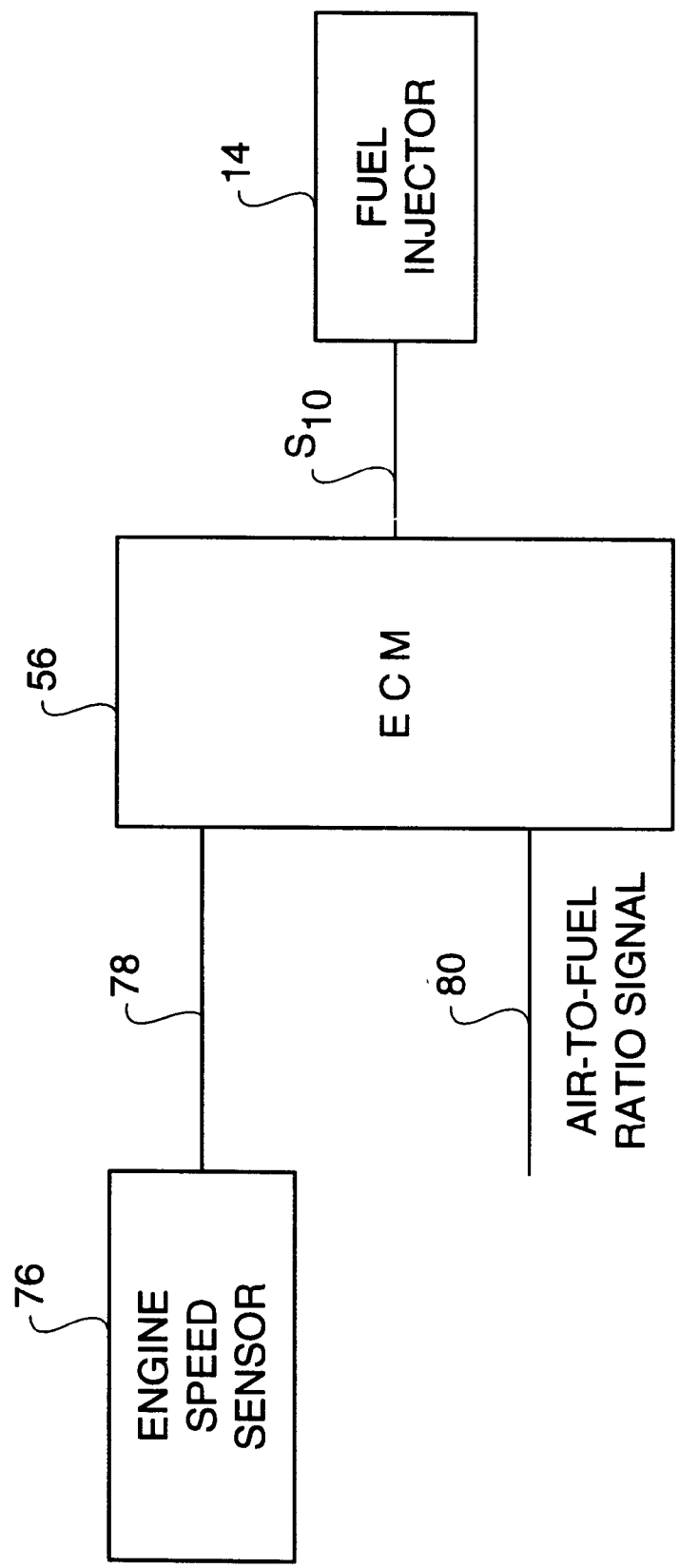

APPARATUS AND METHOD FOR CONTROLLING FUEL INJECTION SIGNALS DURING ENGINE ACCELERATION AND DECELERATION

TECHNICAL FIELD

This invention relates generally to electronically controlled fuel injected engines and, more particularly, to controlling fuel injection signals during engine acceleration or deceleration wherein at least one of the fuel injection shots associated with a multi-shot fuel injection event may be disabled to control fuel emissions.

BACKGROUND ART

Electronically controlled fuel injectors are well known in the art including both hydraulically actuated electronically controlled fuel injectors as well as mechanically actuated electronically controlled fuel injectors. Electronically controlled fuel injectors typically inject fuel into a specific engine cylinder as a function of a fuel injection signal received from an electronic controller. These signals include waveforms that are indicative of a desired fuel injection rate as well as the desired timing and quantity of fuel to be injected into the respective cylinders of the engine.

Emission regulations pertaining to engine exhaust emissions are becoming increasingly restrictive throughout the world including, for example, restrictions on the emission of hydrocarbons, carbon monoxide, the release of particulates, and the release of oxides of nitrogen ($NO_x$). Tailoring the fuel injection waveform, that is the number of injections and the injection rate of fuel to a combustion chamber, as well as the quantity and timing of such fuel injections, is one way to improve emissions and meet higher emissions standards. As a result, multiple fuel injection techniques, wherein the fuel injection waveform comprises a plurality of distinct fuel injection signals, have been utilized to modify the burn characteristics of the combustion process in an attempt to reduce emission and noise levels. Multiple fuel injections typically involve splitting the total fuel delivery to the cylinder during a particular injection event into separate fuel injections, such as a pilot injection, a main injection, and an anchor injection where a three shot injection is desired. Each of these injections may also be referred to generally as a shot, and the term shot as used in the art may also refer to the actual fuel injection or to the command current signal to a fuel injector indicative of an injection or delivery of fuel to the engine. At different engine operating conditions, it may be necessary to use different injection strategies in order to achieve both desired engine performance and emissions control.

As used throughout this disclosure, an injection event is defined as the injections that occur in a cylinder during one cycle of the engine. For example, one cycle of a four stroke engine for a particular cylinder, includes an intake, compression, expansion, and exhaust stroke. Therefore, the injection event in a four stroke engine includes the number of injections, or shots, that occur in a cylinder during the four strokes of the piston. The term shot as used in the art may also refer to the actual fuel injection or to the command current signal to a fuel injector or other fuel actuation device indicative of an injection or delivery of fuel to the engine.

During certain acceleration events, not all of the fuel delivered to the engine in the distinct fuel shots of a multi-shot fuel injection event is combusted for a variety of reasons. For example, where a turbo charger is used, during an acceleration event the air mass delivered to the engine is lower because the turbo charger device associated with the engine has to spin up to deliver a greater quantity of air corresponding to the increase in the fuel. When a rich fuel mixture is introduced into the cylinder, more fuel is likely to contact the cylinder walls than with a comparatively leaner fuel mixture. Because a cylinder's walls are typically cooler in comparison to the interior of the cylinder, the fuel does not combust but instead mixes with the cylinder wall lubricating oil. This fuel deteriorates the lubricating quality of the engine oil, and adversely impacts the fuel efficiency of the engine. Furthermore, such uncombusted fuel may be emitted in the form of hydrocarbons, which are a pollutant and therefore an undesirable component of an engine's emissions.

Further during an acceleration event, the time duration of fuel injection events may decrease. It becomes more difficult to inject multiple shots into a shrinking time window for a cylinder as engine speed increases. Rapidly changing engine speed can cause timing errors for all shots but especially the anchor shot since it is a time delay after the main shot. As a result, the time difference between the end of one fuel shot in a particular fuel injection event and the beginning of a subsequent fuel shot in the same fuel injection event decreases. Therefore, it becomes increasingly important to deliver the individual fuel shots accurately as the timing between fuel shots becomes tighter. However, the changing engine speed corresponds to a change in the crank angle for injecting the particular fuel shot. Therefore, the desired angle determined for the injection of each fuel shot in each fuel injection event might be slightly offset from the actual desired angle of injection. Such a situation is not desirable because offset fuel injection shots may detrimentally impact the engine's performance, efficiency, and emissions.

In a deceleration event, on the other hand, the amount of fuel delivered in a fuel injection event decreases. As the amount of fuel decreases, it becomes increasingly difficult to physically partition the fuel into distinct fuel shots. For small enough amounts of fuel, the improperly partitioned amounts of fuel may result in improper or undesirable performance, efficiency, and emissions of the engine.

Further during a deceleration event, the time duration of each fuel injection may increase. As discussed for acceleration above, the time to angle conversion for the individual fuel shots may be inaccurate when the speed of the engine is changing. As a result, the inaccurate (or offset) fuel injection events may detrimentally impact the engine's performance, efficiency, and emissions during a deceleration event.

It is therefore desirable to provide an apparatus and method to control the delivery of fuel to an engine to control emissions during acceleration and deceleration. Accordingly, the present invention is directed to overcoming one or more of the problems as set forth above.

DISCLOSURE OF THE INVENTION

In one aspect of the present invention, an apparatus and method is disclosed for electronically controlling a multi-shot fuel injection event during acceleration and deceleration events to better control the engine's fuel emissions during such events. More particularly, an electronic controller is operable to recognize an acceleration or deceleration event based upon certain sensed engine parameters and thereafter dynamically adjust the number of fuel injections to control the delivery of fuel to the engine during acceleration or deceleration events. As a result, the engine's emissions may be maintained within predetermined limits during the acceleration and deceleration events.

BRIEF DESCRIPTION OF THE DRAWINGS

For a better understanding of the present invention, reference may be made to the accompanying drawings in which:

FIG. 4 is a graphical illustration of one embodiment of an electronic control system constructed in accordance with the teachings of the present invention.

BEST MODE FOR CARRYING OUT THE INVENTION

Figure 1:
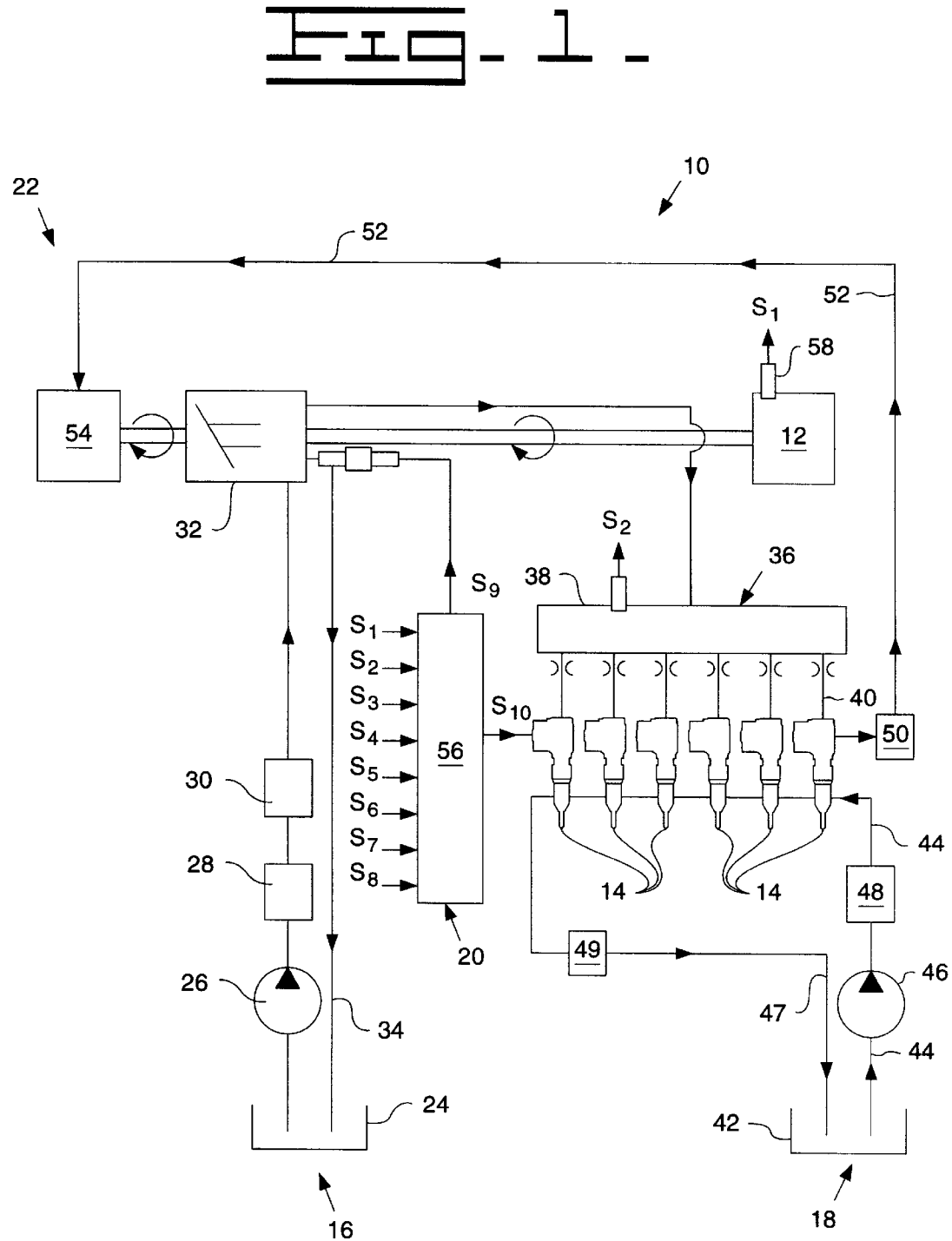
FIG. 1 is a typical schematic view of an electronically controlled fuel injector system usable in one embodiment of the present invention.

Referring to FIG. 1, there is shown one embodiment of a hydraulically actuated electronically controlled fuel injection system 10 in an exemplary configuration as adapted for a direct-injection compression ignition engine 12. Fuel system 10 includes one or more electronically controlled fuel injection devices, such as a fuel injector 14, which are adapted to be positioned in a respective cylinder head bore of the engine 12. While the embodiment of FIG. 1 applies to an in-line six cylinder engine, it is recognized and anticipated, and it is to be understood, that the present invention is also equally applicable to other types of engines such as V-type engines and rotary engines, and that the engine may contain any plurality of cylinders or combustion chambers. In addition, while the embodiment of FIG. 1 also illustrates a hydraulically actuated electronically controlled fuel injector system, it is likewise recognized and anticipated that the present invention is also equally applicable to other types of fuel injection devices, including electronically controlled injectors, mechanically actuated electronically controlled injector units as well as fluid activated common rail type fuel injection systems with digitally controlled fuel valves.

The fuel system 10 of FIG. 1 includes an apparatus or means 16 for supplying actuation fluid to each injector 14, an apparatus or means 18 for supplying fuel to each injector, electronic control means 20 for controlling the fuel injection system including the manner and frequency in which fuel is injected by the injectors 14 including timing, number of injections per injection event, fuel quantity per injection, time delay between each injection, and the injection profile. The system may also include apparatus or means 22 for recirculating fluid and/or recovering hydraulic energy from the actuation fluid leaving each injector 14.

The actuating fluid supply means 16 preferably includes an actuating fluid sump or reservoir 24, a relatively low pressure actuating fluid transfer pump 26, an actuating fluid cooler 28, one or more actuation fluid filters 30, a high pressure pump 32 for generating relatively high pressure in the actuation fluid, and at least one relatively high pressure actuation fluid manifold or rail 36. A common rail passage 38 is arranged in fluid communication with the outlet from the relatively high pressure actuation fluid pump 32. A rail branch passage 40 connects the actuation fluid inlet of each injector 14 to the high pressure common rail passage 38. In the case of a mechanically actuated electronically controlled injector, manifold 36, common rail passage 38 and branch passages 40 would typically be replaced with some type of cam actuating arrangement or other mechanical means for actuating such injectors. Examples of a mechanically actuated electronically controlled fuel injector unit are disclosed in U.S. Pat. Nos. 5,947,380 and 5,407,131.

Apparatus 22 may include a waste accumulating fluid control valve 50 for each injector, a common recirculation line 52, and a hydraulic motor 54 connected between the actuating fluid pump 32 and recirculation line 52. Actuation fluid leaving an actuation fluid drain of each injector 14 would enter the recirculation line 52 that carries such fluid to the hydraulic energy recirculating or recovering means 22. A portion of the recirculated actuation fluid is channeled to high pressure actuation fluid pump 32 and another portion is returned to actuation fluid sump 24 via recirculation line 34.

In a preferred embodiment, the actuation fluid is engine lubricating oil and the actuating fluid sump 24 is an engine lubrication oil sump. This allows the fuel injection system to be connected as a parasitic subsystem to the engine's lubricating oil circulation system. Alternatively, the actuating fluid could be fuel or some other type of liquid.

The fuel supply means 18 preferably includes a fuel tank 42, a fuel supply passage 44 arranged in fluid communication between the fuel tank 42 and the fuel inlet of each injector 14, a relatively low pressure fuel transfer pump 46, one or more fuel filters 48, a fuel supply regulating valve 49, and a fuel circulation and return passage 47 arranged in fluid communication between each injector 14 and fuel tank 42.

Electronic control means 20 preferably includes an electronic control module (ECM) 56, also referred to as a controller, the use of which is well known in the art. ECM 56 typically includes processing means such as a microcontroller or microprocessor, a governor such as a proportional integral derivative (PID) controller for regulating engine speed, and circuitry including input/output circuitry, power supply circuitry, signal conditioning circuitry, solenoid driver circuitry, analog circuits and/or programmed logic arrays as well as associated memory. The memory is connected to the microcontroller or microprocessor and stores instruction sets, maps, lookup tables, variables, and more. ECM 56 may be used to control many aspects of fuel injection, including (1) the fuel injection timing, (2) the total fuel injection quantity during an injection event, (3) the fuel injection pressure, (4) the number of separate injections or fuel shots during each injection event, (5) the time intervals between the separate injections or fuel shots, (6) the time duration of each injection or fuel shot, (7) the fuel quantity associated with each injection or fuel shot, (8) the actuation fluid pressure, (9) electrical current level of the injector waveform, and (10) any combination of the above parameters. Each of such parameters are variably controllable independent of engine speed and load. ECM 56 receives a plurality of sensor input signals $S_1$–$S_8$ which correspond to known sensor inputs such as engine operating conditions including engine speed, engine temperature, pressure of the actuation fluid, cylinder piston position and so forth that are used to determine the desired combination of injection parameters for a subsequent injection event.

For example, an engine temperature sensor 58 is illustrated in FIG. 1 connected to engine 12. In one embodiment, the engine temperature sensor includes an engine oil temperature sensor. However, an engine coolant temperature sensor can also be used to detect the engine temperature. The engine temperature sensor 58 produces a signal designated by $S_1$ in FIG. 1 and is inputted to ECM 56 over line $S_1$. In the particular example illustrated in FIG. 1, ECM 56 issues control signal $S_9$ to control the actuation fluid pressure from pump 32 and a fuel injection signal $S_{10}$ to energize a solenoid or other electrical actuating device within each fuel injector thereby controlling fuel control valves within each injector 14 and causing fuel to be injected into each corresponding engine cylinder. Each of the injection parameters are variably controllable, independent of engine speed and load. In the case of the fuel injectors 14, control signal $S_{10}$ is a fuel injection signal that is an ECM commanded current to the injector solenoid or other electrical actuator.

Figure 2:
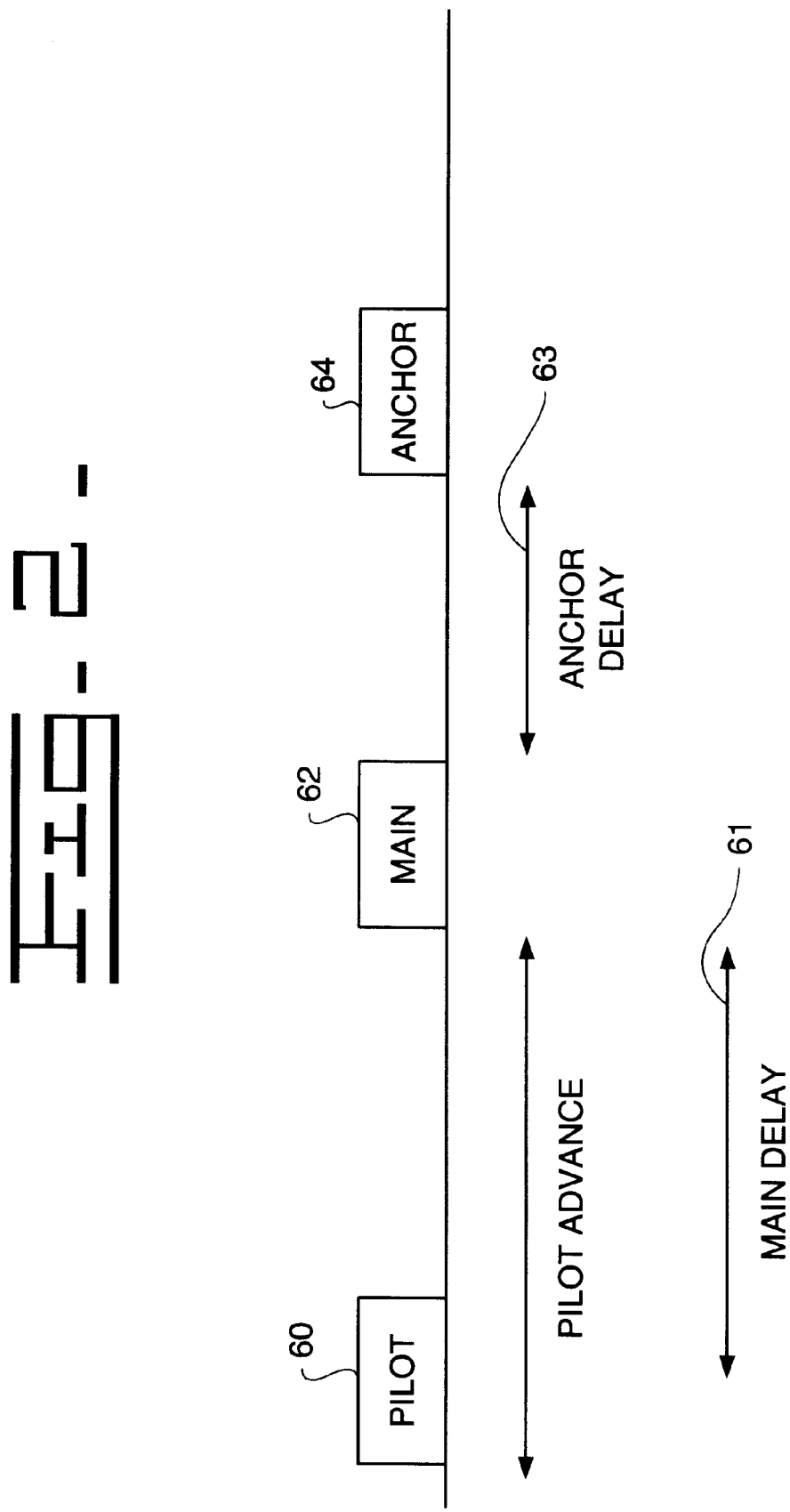
FIG. 2 is a schematic profile of a three shot fuel injection event.

It is recognized that the type of fuel injection desired during a particular fuel injection event will typically vary depending upon various engine operating conditions at the time. In an effort to improve emissions, it has been found that delivering multiple fuel injections to a particular cylinder during a fuel injection event at certain engine operating conditions achieves both desired engine operation as well as emissions control. FIG. 2 illustrates a multiple injection including three separate fuel injections, namely, a first fuel injection or pilot shot 60, a second fuel injection or main shot 62, and a third fuel injection or anchor shot 64. As illustrated in FIG. 2, the pilot shot 60 is injected into the combustion chamber in advance of the main shot 62 by some predetermined time factor, crank angle or main delay 61, and the anchor shot is sequenced after the main shot 62 based upon a predetermined time factor, crank angle or anchor delay 63. Based upon programming associated with electronic controller 56 as well as a variety of different maps and/or lookup tables stored within the memory of ECM 56 including maps and/or tables relating to engine speed, engine load, the pressure associated with rail passage 38 (rail pressure), desired total fuel quantity and other parameters, controller 56 will be able to dynamically determine the appropriate number of fuel shots, the quantity of fuel required for each fuel shot and partition the same accordingly, and it will be able to determine the timing and duration of each individual shot as well as the anchor delay 63. In the three shot multiple injection depicted in FIG. 2, a portion of the total fuel to be delivered to the combustion chamber will be injected by the pilot shot 60, a portion of such total fuel will be injected by the main shot 62, and the remaining portion of the total fuel to be injected will be injected by the anchor shot 64. Under certain engine operating conditions, a multiple fuel injection event utilizing three fuel shots has advantages in terms of exhaust emissions, including reduced particulate emissions and/or reduced $NO_x$ emissions as well as desired engine performance. The multiple fuel injection event may include 2, 3 or more shots depending on the current engine operating conditions.

Figure 3:
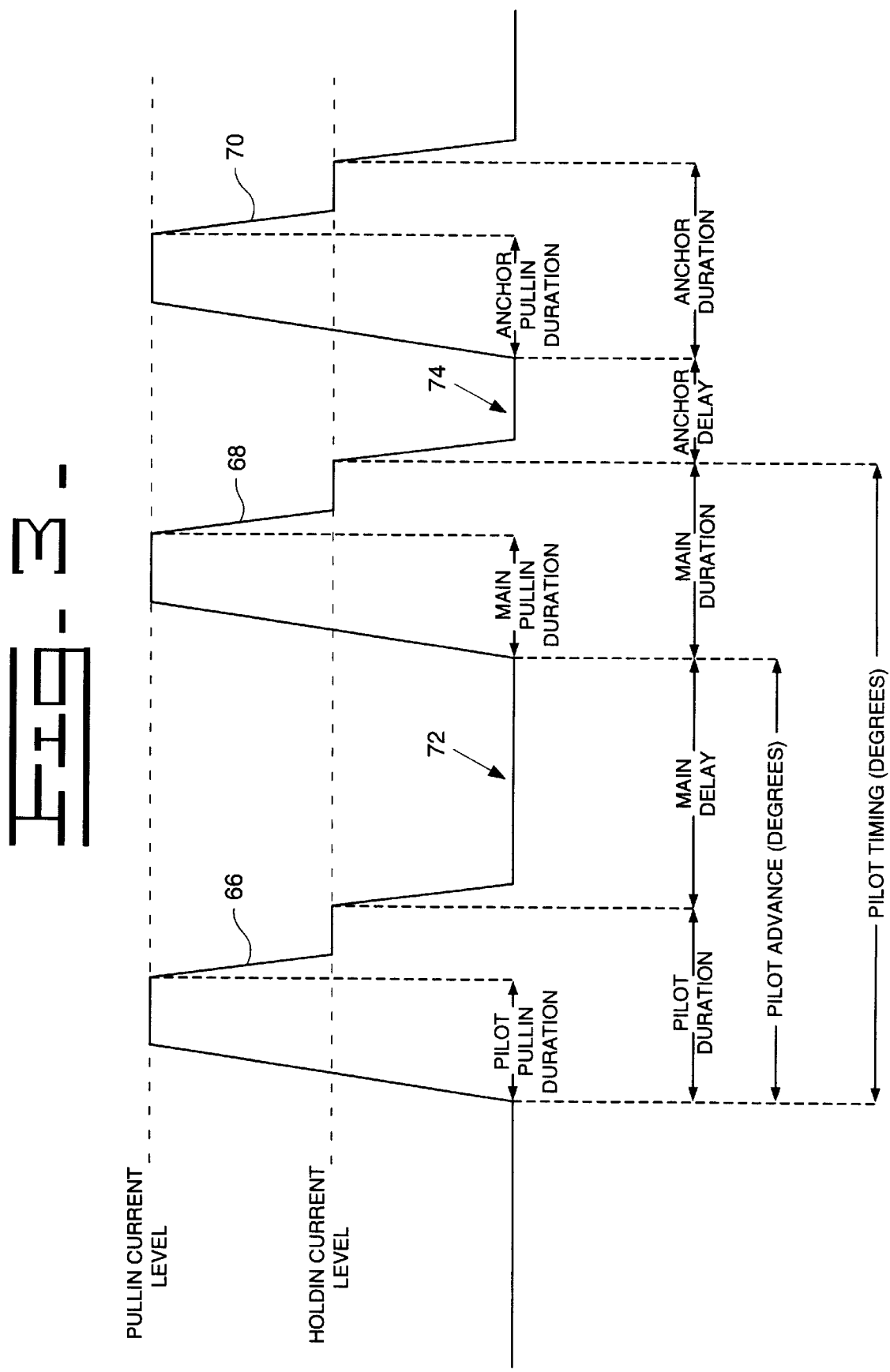
FIG. 3 is a schematic diagram of an exemplary current waveform for a three shot fuel injection event.

An exemplary current waveform for a three shot injection event is illustrated in FIG. 3 showing a first or pilot shot control signal 66, a second or main shot control signal 68, a third or anchor shot control signal 70, a main delay signal 72 between the pilot and main shots, and an anchor delay signal 74 between the main and anchor shots. The duration of each of the control signals 66, 68 and 70 can be varied by ECM 56, and the duration of delays 72 and 74 can likewise be controlled by ECM 56. In a preferred embodiment, the timing and duration of the main shot is determined and set by ECM 56 and the timing and duration of the pilot shot and anchor shot are thereafter determined based upon the main shot timing. In this regard, the start of the pilot shot will typically be determined based upon known parameters such as the main shot timing and pilot advance and the anchor shot timing will be just a time delay based upon termination of the main shot. Other methods for determining the various parameters associated with the three fuel injection shots are likewise recognized and anticipated.

FIG. 3 also illustrates the pull-in and hold in current levels associated with a typical hydraulically actuated electronically controlled fuel injector or other fuel injection device. When using hydraulically actuated electronically controlled fuel injectors, the injection signal includes generally a two-tier form that includes a pull-in current level and a generally lower hold-in current level. The higher pull-in current is used to quickly open the fuel injector and thereby decrease the response time, that is, the time between the initiation of a fuel injection signal and the time in which fuel actually begins to enter the engine cylinder. Once fuel injection has commenced, a lower level hold-in current can be used to hold the injector open for the remainder of the injection event. The pilot, main and anchor pull-in durations are likewise illustrated in the representative current waveform depicted in FIG. 3. Based upon engine operating conditions, the type of fuel and fuel injection devices being utilized, and other parameters, it is recognized and anticipated that the waveform illustrated in FIG. 3 may be modified and altered accordingly.

FIG. 4 illustrates one embodiment of a control system constructed in accordance with the teachings of the present invention provided to generate fuel injection signals $S_{10}$ to fuel injection devices 14. During engine acceleration, the speed of the engine increases in accordance with the requested rate of acceleration and an additional amount of fuel is delivered to the engine to facilitate the acceleration. The amount of fuel delivered to the engine during such acceleration events is typically determined from or limited by a fuel, torque or other map or table available to electronic control means 20, which maps and look-up tables may be implemented in any of the various ways known in the art. This additional amount of fuel delivered to the engine during an acceleration event generally requires a corresponding amount of additional air in order to maintain desired emission and performance standards, which is usually generated and supplied by a turbo charger device associated with the engine. This turbo charged air is mixed with the fuel to facilitate complete combustion of all fuel delivered to the respective cylinders in engine 12.

During certain acceleration conditions, however, the turbo charger device may not achieve the desired response in order to increase the amount of air in proportion to the additional amount of fuel being delivered to the engine. As a result, the air-to-fuel ratio may decrease significantly during certain acceleration events with the air/fuel mixture being too rich with fuel. The same issue may also occur in engines without turbo chargers. The inadequate amount of air is usually due to the delay in the response time of the turbo charger device, which usually requires time to spin up to perform at the desired capacity during an acceleration event. The high fuel-to-air ratio allows more fuel to contact the cylinder walls than with a comparatively leaner fuel mixture. The walls of the cylinder are usually comparatively cooler, whereby this fuel may not combust and instead will be mixed with the cylinder wall lubricating oil. This uncombusted fuel may deteriorate the lubrication properties of the oil, and it may also be emitted from the engine as hydrocarbons. Those skilled in the art will appreciate that the occurrence of either of these events is undesirable.

Further depending upon the responsiveness of the fuel control strategy, during an acceleration event, the time duration of each fuel injection event may decrease as the speed of the engine increases. In addition, the time duration or interval between the end of one fuel shot and the commencement of a subsequent fuel shot may decrease, whereby accurate timing of each distinct fuel shot becomes all the more important. In an acceleration event, however, the start of each distinct fuel shot may not occur at the desired time. The reason therefor is that the start relative angle of each fuel shot is usually converted to an absolute crank angle value corresponding to the angular position of a crankshaft associated with the engine during the respective fuel injection event. However, since the speed of the engine is rapidly changing, the actual placement of the fuel shot may be less accurate by the time the crankshaft reaches the calculated angular position. Therefore, it is difficult to get a desired amount of fuel at the desired timing or duration. For example, if acceleration is accounted for in injection timing, it may be difficult to get all of the desired fuel where it is desired. This offset fuel shot timing may result in erratic performance of the engine and poor emissions during the acceleration event. Further, due to air-to-fuel ratio issues, the fuel that is delivered to the cylinder can lead to undesirable emissions. Therefore, in one embodiment of the present invention, during periods of acceleration, the amount of fuel associated with the pilot shot may be reduced, or the pilot shot may be eliminated altogether and the amount of fuel associated therewith placed or distributed in the remaining fuel shots. In another embodiment, the timing of the pilot shot may be moved closer to piston top dead center of the compression stroke in order to minimize the exposure of the cylinder wall to the pilot fuel spray.

In order to overcome these problems during an acceleration event, one or more fuel shots may be disabled during the acceleration event. Disabling shots, such as the pilot shot, in a fuel injection event during acceleration may reduce the occurrence of fuel penetration to the cylinder walls, which reduces fuel dilution of the lubrication oil and the amount of hydrocarbon byproducts in the engine's exhaust emissions. A decrease in the amount of uncombusted fuel in the cylinder helps improve the fuel efficiency and emissions of the engine. Further, a reduced number of distinct fuel shots helps reduce the problems associated with time to angle conversion errors in the commencement of the main/anchor shot sequence as discussed above. Accordingly, in one embodiment of the present invention, either the pilot shot or the anchor shot, or both shots, are disabled during an acceleration event, whereby the likelihood of occurrence of the problems discussed above is considerably reduced during the acceleration event. In another embodiment, any one of the pilot, main or anchor shots may be deleted, or any combination thereof. In the preferred embodiment, however, the main shot is retained while either the pilot and/or the anchor shots are removed.

During a deceleration event, on the other hand, the amount of fuel delivered to the cylinders of engine 12 decreases rapidly. As the amount of fuel decreases, accurately partitioning the desired amount of fuel into a plurality of distinct shots becomes increasingly difficult. Improper partitioning of the fuel into the appropriate shots may result in undesired engine performance and poor engine efficiency during a deceleration event. Further during a deceleration event, the time to angle conversion (the crankshaft position) of the start of each shot during a fuel injection event may be offset due to the changing (decreasing) engine speed similarly as discussed above for an acceleration event. Such offset or error may also result in undesired engine performance, and therefore poor engine efficiency.

To overcome these problems during a deceleration event, the total number of fuel shots are decreased during the deceleration event in one embodiment of the present invention. It is recognized and anticipated that just the pilot shot, just the anchor shot, or both the pilot shot and the anchor shot, may be disabled during a deceleration event. As a result, the amount of fuel delivered to the respective cylinder may be partitioned in a lesser number of shots, and the problems associated with time to angle conversion errors in the start times of the plurality of fuel shots are decreased. Accordingly, disabling one or more shots during a deceleration event reduces the likelihood of occurrence of the problems discussed above during the deceleration event. Alternatively, the main shot may also be disabled. However, for emissions and performance reasons, the main shot preferably remains enabled.

In one embodiment of the present invention, the fuel from the disabled shot, or the disabled shots, is removed altogether from the respective fuel injection event when either an acceleration event or a deceleration event is detected. In effect, therefore, in such embodiment, the amount of fuel associated with each of the remaining shots remains the same, but the total amount of fuel delivered in the particular fuel injection event is less than desired and the number of total shots in the fuel injection event is also reduced. In the preferred embodiment, however, the fuel from the disabled shot, or the disabled shots, is maintained for the particular fuel injection event by distributing the fuel associated with the disabled shot(s) to the remaining shots. In such embodiment, the total amount of fuel delivered in the particular fuel injection event remains as desired but there are fewer number of total shots in the fuel injection event and there is a greater amount of fuel associated with one or more of the remaining shots.

It is further recognized and anticipated that in the embodiment wherein the amount of fuel from the disabled shot or shots is distributed to the remaining shot or shots in the particular fuel injection event, if the total amount of fuel in the disabled shot or shots is less than a threshold amount of fuel, then this amount of fuel may be removed altogether from the particular fuel injection event rather than being distributed into the remaining shot or shots. The reason therefor is because in particular fuel injection events, redistributing such a small amount of fuel into the remaining shots may not be efficient or desirable, or it may even be impracticable, wherein removing it altogether may be a more desirable option.

ECM 56 may also be designed to remove or disable one or more fuel injection shots only for the duration of the respective acceleration or deceleration event when such an event is detected. As the engine catches up and is no longer accelerating or decelerating, whichever the particular event may be, the fuel injection signals may be returned to normal, that is, the disabled shot or shots may be re-enabled, either gradually over a number of fuel injection signals, or more abruptly in a single fuel injection event, or electronic control means 20 may keep one or more fuel injection shots disabled for a certain amount of time or until another predetermined criteria is satisfied. It is recognized and anticipated that the particular strategy implemented therefor will typically vary from one embodiment to another.

In order to practice the present invention, electronic control means 20 or ECM 56 must be operable to detect, determine or otherwise recognize certain engine acceleration or deceleration conditions such that the injection signal can be controlled accordingly to achieve the desired fuel injection waveform, including the number of shots therein, necessary to maintain emissions within proper limits. This may be accomplished in a variety of ways, and any one or a combination thereof may be utilized. In one embodiment, a signal generating means such as an engine speed sensor 76 is coupled to ECM 56 and is operable to output a signal 78 thereto indicative of the speed of the engine. Based upon input signal 76, ECM 56 is operable to determine the rate of change of the engine speed over time. If the rate of change of the engine speed exceeds a predetermined threshold value, for example, in the range of about 1,000 rpm to about 2,000 rpm per second, ECM 56 will determine or recognize that this rate of speed change is indicative of an acceleration or deceleration event which will exceed a predetermined emissions limit, and will therefore control the fuel injection signals accordingly.

In another embodiment, ECM 56 is operable to receive a signal 80 indicative of the air-to-fuel ratio of the fuel mixture being delivered to the cylinders of the engine. During certain acceleration events, the air-to-fuel ratio will decrease due to an increase in the amount of fuel delivered to the engine. During certain other deceleration events, the air-to-fuel ratio will increase due to a decrease in the amount of fuel delivered to the engine. ECM 56 will thus determine or otherwise recognize certain acceleration or deceleration conditions if the air-to-fuel ratio increases or decreases by a predetermined threshold amount. ECM 56 will thereafter control the fuel injection signals accordingly.

It is recognized and anticipated that any one or a plurality of other signal providing mechanisms may likewise be coupled to ECM 56 for providing a signal thereto indicative of a condition which can be correlated to an acceleration or deceleration event wherein a desired emissions limit will be exceeded. Such mechanisms may be any of the various mechanisms known in the art such as a rail pressure sensor, an air intake boost pressure sensor and still other sensors.

INDUSTRIAL APPLICABILITY

As described herein, the present apparatus and method has particular utility in all types of engines, such as engines utilized in vehicles, work machines, marine vessels, electrical generators, stationary engines, and the like. The present apparatus and method, therefore, provides a control system and method for controlling the number of fuel shots in any multi-shot fuel injection signal based upon certain acceleration or deceleration conditions which yield undesirable exhaust emissions.

It is recognized and anticipated that the engine threshold values, the time periods of engine performance monitoring by electronic control means 20, and the like, may be pre-programmed into the electronic control means 20, or such values may be available in maps or tables stored in a memory means or data storage means associated with electronic control means 20. Alternatively, such values may be determined by appropriate formulas or mathematical computations to be performed by ECM 56 in a continuing loop or at fixed time intervals. In this regard, appropriate fuel maps relating rail pressure, engine speed, engine load, pilot/main/anchor duration times, pilot/main/anchor fuel quantities, anchor timing delays, pilot/main timing, and other parameters can be stored or otherwise programmed into ECM 56 for use during all operating conditions of the engine. These operational maps, tables and/or mathematical equations stored in the ECM programmable memory determine and control the various parameters associated with the appropriate multiple injection events to achieve desired engine performance. Accordingly, it is recognized and anticipated that electronic control means 20 may perform such steps in any one of the various ways known in the art.

It is also recognized and anticipated that electronic control means 20 may determine or recognize certain acceleration or deceleration events and reduce, eliminate or disable one or more fuel shots associated with the fuel injection signal based upon just one of the various inputs thereto, or it may do so based upon a combination of such inputs, possibly even giving different weight to the different input values. Further, it is recognized and anticipated that the action taken by electronic control means 20 may be any one or a combination of the various actions that it is capable of taking, such as eliminating or disabling only the pilot shot, eliminating or disabling only the anchor shot, or eliminating or disabling both the pilot and anchor shots.

It is recognized and anticipated that ECM 56 may be designed to eliminate or disable one or more fuel injection shots only for the duration of the respective acceleration or deceleration event. As the engine catches up and is no longer accelerating or decelerating, whichever the case may be, the fuel injection signals may be returned to normal, that is, the disabled shot or shots are re-enabled, either gradually over a number of fuel injection signals, or more abruptly in a signal fuel injection event, or electronic control means 20 may keep one or more fuel injection shots disabled for a certain amount of time or until another predetermined criteria is satisfied.

It may be anticipated that engine efficiency and performance may be sacrificed during certain acceleration events to control emissions if the amount of fuel being provided to the engine during such event is decreased when one or more shots are disabled. It may also be appreciated that disabling one or more fuel shots during certain deceleration events will not be particularly detrimental to the performance of the engine since the engine is decelerating, and providing additional fuel during such deceleration event will usually not be necessary. In both events, however, it may be appreciated that the overall emissions of engine 12 may be maintained within desirable limits, and the overall emissions are maintained within desirable limits in the preferred embodiment.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A control system for controlling multi-shot fuel injection signals to a direct fuel injection device in a compression ignition engine, said control system comprising:

an electronic controller coupled to the fuel injection device, said controller being operable to receive a plurality of signals indicative of an engine operating condition prior to an injection event, said controller being operable to output a signal indicative of a multi-shot fuel injection to the fuel injection device;

at least one signal providing mechanism coupled to said controller for inputting a signal thereto indicative of an acceleration or deceleration of said engine;

said controller being operable to recognize an acceleration or deceleration condition based upon said input signal; and said controller being further operable to determine a desired amount of fuel to be injected into an engine cylinder as a function of said engine operating condition prior to said injection event, partition said desired amount of fuel among a plurality of fuel shots of said injection event, determine whether said acceleration or deceleration event is recognized, disable a fuel shot in response to recognizing an acceleration or deceleration event, repartition a fuel amount allocated to said disabled shot among other fuel shots, and produce said output signal.

2. The control system as set forth in claim 1 wherein said input signal can be correlated to an acceleration or deceleration condition of the engine wherein the engine will exceed a predetermined threshold emissions limit.

3. The control system as set forth in claim 1 wherein said input signal is indicative of engine speed, said controller being operable to determine a rate of change of the engine speed and to output said signal to dynamically modify the number of fuel injections in the multi-shot fuel injection signal when said rate of change of the engine speed exceeds a first predetermined threshold value.

4. The control system as set forth in claim 3 wherein said signal providing mechanism is an engine speed sensor.

5. The control system as set forth in claim 1 wherein said input signal is indicative of engine speed, said controller being operable to determine a rate of change of the engine speed and to dynamically modify the number of fuel injections in the multi-shot fuel injection signal when said rate of change of the engine speed is below a second predetermined threshold value.

6. The control system as set forth in claim 1 wherein said input signal is indicative of an air-to-fuel ratio being supplied to the engine, said controller dynamically modifying the number of fuel injections in said multi-shot fuel injection signal when said air-to-fuel ratio exceeds a first predetermined threshold value.

7. The control system as set forth in claim 1 wherein said input signal is indicative of the air-to-fuel ratio being supplied to the engine, said controller dynamically modifying the number of fuel injections in said multi-shot fuel injection signal when said air-to-fuel ratio is below a second predetermined threshold value.

8. The control system as set forth in claim 1 wherein said at least one disabled fuel shot in the multi-shot fuel injection signal is re-enabled when the recognized acceleration or deceleration event is no longer recognized.

9. The control system as set forth in claim 1 wherein the multi-shot fuel injection signal includes three fuel shots, two of said three fuel shots being disabled when said acceleration or deceleration condition is recognized.

10. The control system as set forth in claim 1 wherein said controller is operable to receive a plurality of input signals indicative of an acceleration or deceleration condition, said controller being operable to recognize such acceleration or deceleration condition based upon a combination of said plurality of input signals.

11. The control system as set forth in claim 1 wherein said fuel injection signal is indicative of a pilot fuel shot, a main fuel shot and an anchor fuel shot, and said at least one disabled fuel shot is said pilot fuel shot.

12. The control system as set forth in claim 1 wherein said fuel injection signal is indicative of a pilot fuel shot, a main fuel shot and an anchor fuel shot, and said at least one disabled fuel shot is said anchor fuel shot.

13. The control system as set forth in claim 1 wherein said fuel injection signal is indicative of a pilot fuel shot, a main fuel shot and an anchor fuel shot, and said at least one disabled fuel shot is said pilot fuel shot and said anchor fuel shot.

14. A method for controlling multi-shot fuel injection signals of an injection event to an electronically controlled direct injection fuel injector of a compression ignition engine during certain acceleration and deceleration conditions, the method comprising the steps of:

sensing a plurality of conditions associated with the operation of the engine;

determining a desired fuel quantity to be injected during said fuel injection event as a function of said plurality of conditions, wherein said desired fuel quantity is determined prior to said injection event;

determining a desired multi shot fuel injection signal as a function of said desired fuel quantity;

establishing an acceleration or deceleration condition based upon one of said sensed conditions;

modifying the multi-shot fuel injection signal to the fuel injector to disable at least one fuel shot therein when the established acceleration or deceleration condition is recognized;

determining said multi shot fuel injection signal as a function of said step of modifying; and delivering said multi shot fuel injection signal to said direct injection fuel injector.

15. The method as set forth in claim 14 wherein said acceleration or deceleration condition is established based upon a predetermined threshold emissions limit being exceeded.

16. The method as set forth in claim 14 wherein said sensed condition is the speed of the engine.

17. The method as set forth in claim 14 wherein said sensed condition is the air-to-fuel ratio of the fuel and air mixture being delivered to the engine.

18. The method as set forth in claim 14 including the step of:

re-enabling said at least one disabled fuel hot in the multi-shot fuel injection signal when the established acceleration or deceleration condition is no longer recognized.

19. The method as set forth in claim 14 wherein the multi-shot fuel injection signal includes a pilot shot, a main shot, and an anchor shot, and said at least one disabled fuel shot is said pilot shot.

20. The method as set forth in claim 14 wherein the multi-shot fuel injection signal includes a pilot shot, a main shot, and an anchor shot, and said at least one disable fuel shot is said anchor shot.

21. The method as set forth in claim 14 further comprising redistributing fuel from said at least one disabled shot to other shots in the multi-shot fuel injection signal.

* * * * *

UNITED STATES PATENT AND TRADEMARK OFFICE
CERTIFICATE OF CORRECTION

PATENT NO.    : 6,453,874 B1
DATED         : September 24, 2002
INVENTOR(S)   : Kevin P. Duffy et al.

It is certified that error appears in the above-identified patent and that said Letters Patent is hereby corrected as shown below:

Column 12,
Line 43, remove the word "hot" and replace with -- shot --.

Signed and Sealed this

Fourteenth Day of January, 2003

JAMES E. ROGAN
*Director of the United States Patent and Trademark Office*